US012645488B2

(12) United States Patent
Tax et al.

(10) Patent No.: US 12,645,488 B2

(45) Date of Patent: Jun. 2, 2026

(54) SYSTEM AND METHOD FOR EFFICIENT DATA TRANSFERS WITHIN A DISTRIBUTED LEDGER TECHNOLOGY (DLT) NETWORK

(71) Applicant: The Toronto-Dominion Bank, Toronto (CA)

(72) Inventors: David Samuel Tax, Toronto (CA); Milos Dunjic, Oakville (CA); Jonathan Joseph Prendergast, West Chester, PA (US); Hitesh Bajaj, Duluth, GA (US); Kenneth Tien Poh Wong, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 418 days.

(21) Appl. No.: 18/348,179

(22) Filed: Jul. 6, 2023

(65) Prior Publication Data

US 2025/0013488 A1 Jan. 9, 2025

(51) Int. Cl.
*G06F 9/44* (2018.01)
*G06F 9/46* (2006.01)

(52) U.S. Cl.
CPC .................................... *G06F 9/466* (2013.01)

(58) Field of Classification Search
CPC ....................................................... G06F 9/466

USPC ........................................................ 718/101
See application file for complete search history.

(56) References Cited

U.S. PATENT DOCUMENTS

| | | | |
|---|---|---|---|
| 8,224,744 B2 | 7/2012 | Pessin | |
| 11,200,551 B2 | 12/2021 | Hegge et al. | |
| 2019/0172059 A1* | 6/2019 | Castagna | G06Q 20/389 |
| 2019/0244286 A1 | 8/2019 | Gopalakrishna | |
| 2021/0073808 A1 | 3/2021 | Gu et al. | |
| 2023/0073140 A1 | 3/2023 | Richter et al. | |

* cited by examiner

*Primary Examiner* — Timothy A Mudrick

(74) *Attorney, Agent, or Firm* — Rowand LLP

(57) ABSTRACT

Systems and methods for the efficient transfer of data are disclosed. The method comprises obtaining transfer definitions for a plurality of transfers to be completed, and identifying a set of the plurality of transfers including only the transfers having transfer definitions received during a particular time period. The particular time period has a starting time of no more than ten seconds earlier than a current time. The method further comprises performing an aggregation on the transfers in the set to reduce a number transfers that are to occur, yielding an amended set of transfers; and immediately, after the aggregation, completing the amended set of transfers. Completing the amended set of transfers includes updating a shared infrastructure.

20 Claims, 7 Drawing Sheets

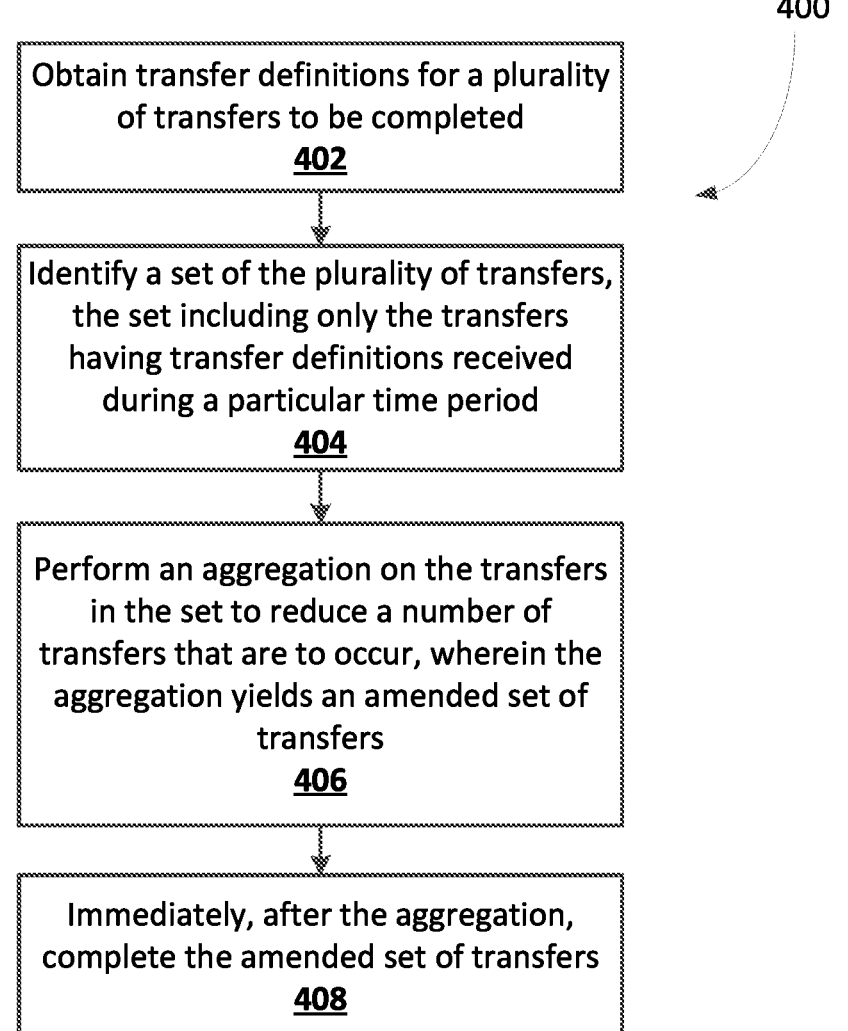

400

Obtain transfer definitions for a plurality
of transfers to be completed
402

Identify a set of the plurality of transfers,
the set including only the transfers
having transfer definitions received
during a particular time period
404

Perform an aggregation on the transfers
in the set to reduce a number of
transfers that are to occur, wherein the
aggregation yields an amended set of
transfers
406

Immediately, after the aggregation,
complete the amended set of transfers
408

FIG. 4

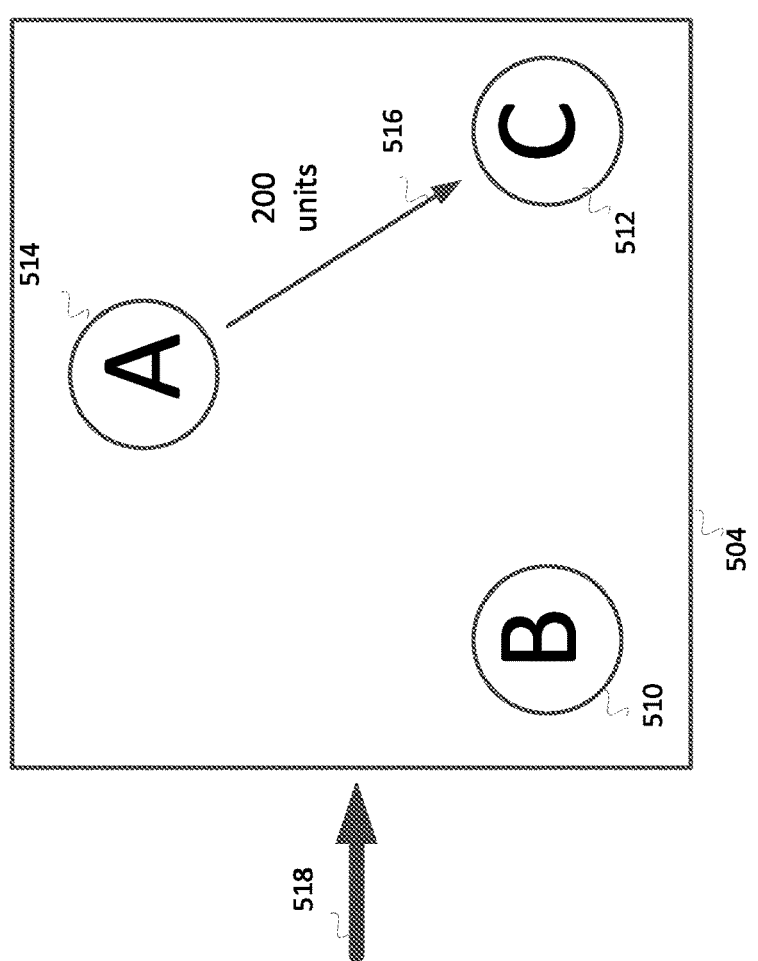
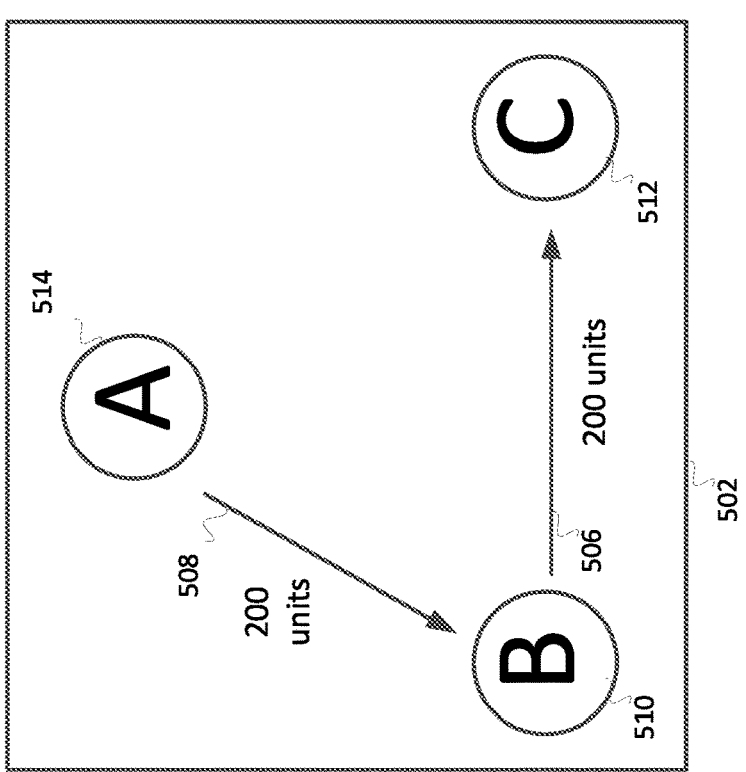
FIG. 5

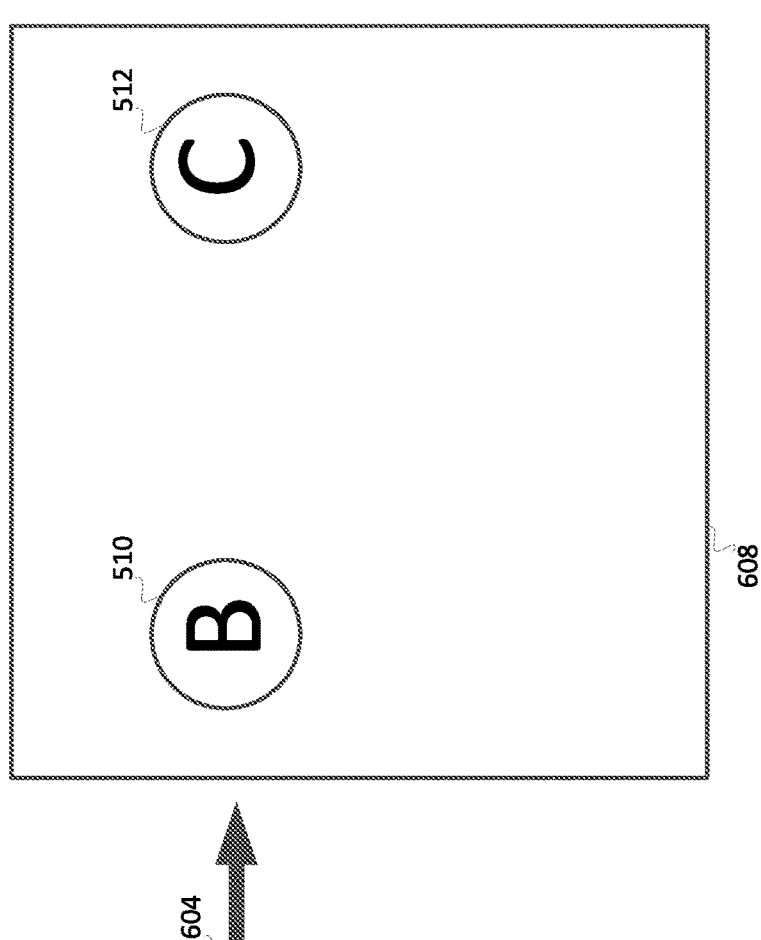
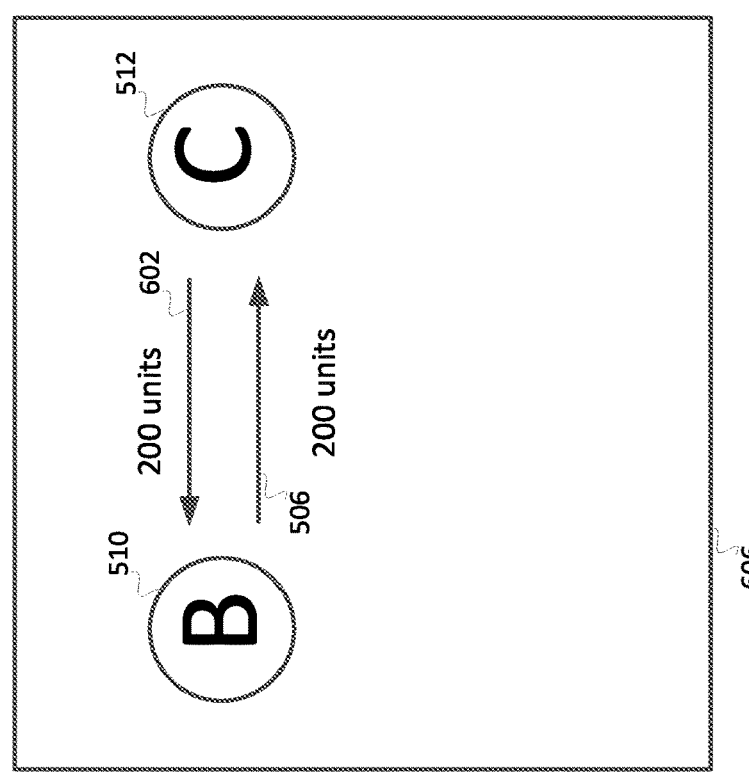
FIG. 6

SYSTEM AND METHOD FOR EFFICIENT DATA TRANSFERS WITHIN A DISTRIBUTED LEDGER TECHNOLOGY (DLT) NETWORK

TECHNICAL FIELD

The present disclosure relates to data transfers, and in particular, to systems and methods for aggregating data transfers to improve computer speed and efficiency.

BACKGROUND

A distributed computing network, such as a distributed ledger technology (DLT) network, may facilitate data transfers. Under certain conditions, a DLT network may be required to complete a very large number of data transfers in real time or in near real time. Rapid processing of the very large number of transfers may require a likewise very large amount of computer processing and computer memory usage. Both the high computer processing and memory requirements may lead to inefficiencies in computer operation and to time delays in executing the transfers, and as well as in executing other computer activities.

Improvements to the field are desired.

BRIEF DESCRIPTION OF THE DRAWINGS

Embodiments will be described, by way of example only, with reference to the accompanying figures wherein:

FIG. 4 shows, in flowchart form, an example method for aggregating data transfers.

FIG. 5 is a schematic illustration of an aggregation of a first instance of a set of a plurality of transfers to a first instance of an amended set of transfers.

FIG. 6 is a schematic illustration of an aggregation of a second instance of a set of a plurality of transfers to a second instance of an amended set of transfers.

Like reference numerals are used in the drawings to denote like elements and features.

DETAILED DESCRIPTION OF EMBODIMENTS

Figure 1:
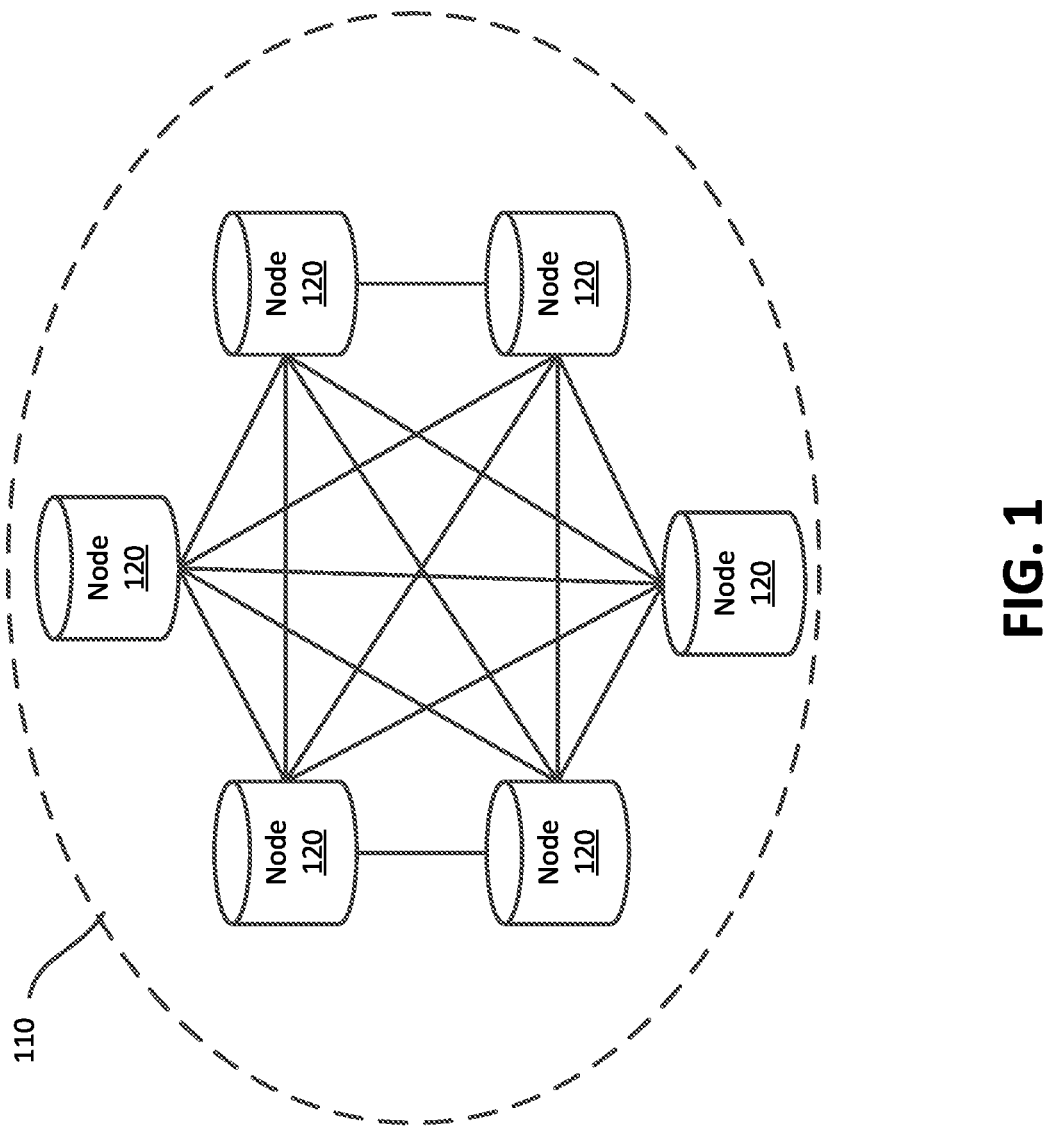
FIG. 1 illustrates an example network associated with a centralized DLT.

In accordance with an aspect of the present disclosure, there is provided a computer system, comprising: a processor; a communications module coupled to the processor; and a memory coupled to the processor, the memory storing instructions that, when executed, configure the processor to: obtain transfer definitions for a plurality of transfers to be completed; identify a set of the plurality of transfers, the set including only the transfers having transfer definitions received during a particular time period, the particular time period having a starting time no more than ten seconds earlier than a current time; perform an aggregation on the transfers in the set to reduce a number transfers that are to occur, wherein the aggregation yields an amended set of transfers; and complete the amended set of transfers, wherein completing the amended set of transfers includes updating a shared infrastructure.

In some implementations, the amended set of transfers are completed substantially immediately after the aggregation.

In some implementations, performing the aggregation on the transfers includes: identifying one or more transfers that may be eliminated and one or more transfers that may be adjusted; and based on the identifying, obtaining the amended set of transfers, the amended set of transfers having a same effect as the identified set of transfers but having a fewer number of transfers.

In some implementations, the set of the plurality of transfers includes: a first transfer associated with a first transfer definition defining a first transferor as a first logical storage area and a first transferee as a second logical storage area; and a second transfer associated with a second transfer definition defining a second transferor as a third logical storage area and a second transferee as the first logical storage area.

In some implementations, the second logical storage area and the third logical storage area are the same.

In some implementations, the set of the plurality of transfers include a plurality of transfers of quantities of obligation units.

In some implementations, the shared infrastructure stores a representation of each of the quantities of obligation units, and each of the quantities of obligation units is associated with an obligation issuer and an obligation holder.

In some implementations, a first obligation issuer associated with a first quantity of obligation units is subject to a first geographical jurisdiction, and a second obligation issuer associated with second obligation units is subject to a second geographical jurisdiction. The first jurisdiction is different than the second jurisdiction.

In some implementations, the shared infrastructure is accessible to systems associated with each transferor and each transferee identified in the transfer definitions.

In some implementations, the shared infrastructure is a distributed ledger.

In some implementations, the particular time period has a starting time no more than five seconds earlier than a current time.

In some implementations, completing the amended set of transfers occurs at a completion time, and the completion time is no more than a minute after the starting time.

In accordance with another aspect of the present disclosure, there is provided a computer-implemented method. The computer-implemented method comprises: obtaining transfer definitions for a plurality of transfers to be completed; identifying a set of the plurality of transfers, the set including only the transfers having transfer definitions received during a particular time period, the particular time period having a starting time no more than ten seconds earlier than a current time; performing an aggregation on the transfers in the set to reduce a number of transfers that are to occur, wherein the aggregation yields an amended set of transfers; and completing the amended set of transfers, wherein completing the amended set of transfers includes updating a shared infrastructure.

In some implementations, the amended set of transfers are completed substantially immediately after the aggregation.

In some implementations, performing the aggregation on the transfers includes: identifying one or more transfers that may be eliminated and one or more transfers that may be adjusted; and based on the identifying, obtaining an amended set of transfers having a same effect as the identified set of transfers but having a fewer number of transfers.

In some implementations, the set of the plurality of transfers includes: a first transfer associated with a first transfer definition defining a first transferor as a first logical storage area and a first transferee as a second logical storage area; and a second transfer associated with a second transfer definition defining a second transferor as a third logical storage area and a second transferee as the first logical storage area.

In some implementations, the second logical storage area and the third logical storage area are the same.

In some implementations, the set of the plurality of transfers include a plurality of transfers of quantities of obligation units.

In some implementations, the shared infrastructure stores a representation of each of the quantities of obligation units, and each of the quantities of obligation units is associated with an obligation issuer and an obligation holder.

In some implementations, the shared infrastructure is accessible to systems associated with each transferor and each transferee identified in the transfer definitions.

In some implementations, the shared infrastructure is a distributed ledger.

In accordance with yet another aspect of the present disclosure, there is provided a non-transitory computer readable storage medium comprising processor-executable instructions which, when executed, configure a processor to: obtain transfer definitions for a plurality of transfers to be completed; identify a set of the plurality of transfers, the set including only the transfers having transfer definitions received during a particular time period, the particular time period having a starting time no more than ten seconds earlier than a current time; perform an aggregation on the transfers in the set to reduce a number of transfers that are to occur, wherein the aggregation yields an amended set of transfers; and complete the amended set of transfers, wherein completing the amended set of transfers includes updating a shared infrastructure.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Distributed ledger technology (DLT) is a consensus of replicated, shared, and synchronized digital data that is geographically spread, or distributed, across many sites, countries, and/or institutions. In contrast to a centralized database, a distributed ledger does not require a central administrator, and consequently does not have a single point-of-failure. A distributed ledger may also be described as a shared infrastructure.

DLT provides users with the ability to view records of changes to the ledger, reduces the need to audit data, ensures data is reliable, and may restrict access to only those who require it. DLT may be used to record transactions, secure identities, collect votes, and demonstrate ownership. DLT also allows for "smart contracts," which are agreements that automatically execute or complete based on prevailing conditions. DLT may be used in nearly every industry where data is collected and used, including aviation, education, healthcare, insurance, manufacturing, transportation, and utilities. Supply chains may benefit greatly from DLT.

In general, a distributed ledger requires a peer-to-peer computer network and consensus protocols to allow reliable replication of the ledger across distributed computer nodes. The most common form of distributed ledger technology is the blockchain (commonly associated with the Bitcoin cryptocurrency), which can be implemented on a public network or a private network. In a blockchain network, the distributed computer nodes maintain a global ledger of all transactions on the blockchain, grouped into blocks, each of which contains a hash of the previous block in the chain. In other forms of distributed network technology, records are stored one after the other in a continuous ledger, rather than sorted into blocks, although they can only be added to the ledger when the participants reach a quorum.

The volume of data transfers handled by a DLT network may be incredibly large. Supporting a large volume of transfers may consume large amounts of computer processing power and computer memory, and, in some cases, may lead to delays in completing data transfers. In one particular example, the amount of daily data transfers associated with the financial industry has been estimated at 1.06 billion data transfers.

In order to reduce the amount of computing power and memory required to support a large volume of transfers, and to ensure the timeliness of data transfer completion, an aggregation may be performed on the transfers prior to the completion of the transfers.

Reference is first made to FIG. 1, which illustrates, in block diagram form, an example computing network associated with distributed ledger technology (DLT), which may be referred to herein as a DLT network 110. The DLT network 110 is a peer-to-peer membership network. Distributed electronic devices running an instance of a consensus protocol under which the DLT operates may participate in the DLT network 110. Such distributed electronic devices may be referred to as nodes 120. The consensus protocol may be, for example, a proof-of-work (PoW) protocol, a proof-of-stake (PoS) protocol, a delegated proof-of-stake (DPoS) protocol, or a Byzantine fault tolerance (BFT) protocol. Some DLT networks may be described as private DLTs, meaning that participation in the DLT is by invitation only.

Nodes 120 maintain a global ledger of all transactions on the distributed ledger. The global ledger is a distributed ledger and each node may store a complete copy or a partial copy of the global ledger. Transactions by a node 120 affecting the global ledger are verified by other nodes 120 so that the validity of the global ledger is maintained.

Some DLT networks may be described as public DLTs, meaning that that participation in the DLT network is open to the public. The details of implementing and operating a DLT network 110 will be appreciated by those ordinarily skilled in the art.

The electronic devices that run the consensus protocol and that form the nodes 120 of the DLT network 110 may be of various types including, for example, computing devices such as computer servers, desktop computers, laptop computers, tablet computers, servers, mobile devices such as smartphones, wearable computers such as smart watches or other electronic devices.

Nodes 120 of the DLT network 110 are coupled to one another using suitable communication technologies which may include wired and wireless communication technologies. In many cases, the DLT network 110 is implemented at least partly over the Internet, and some of the nodes 120 may be located in geographically dispersed locations.

Figure 2:
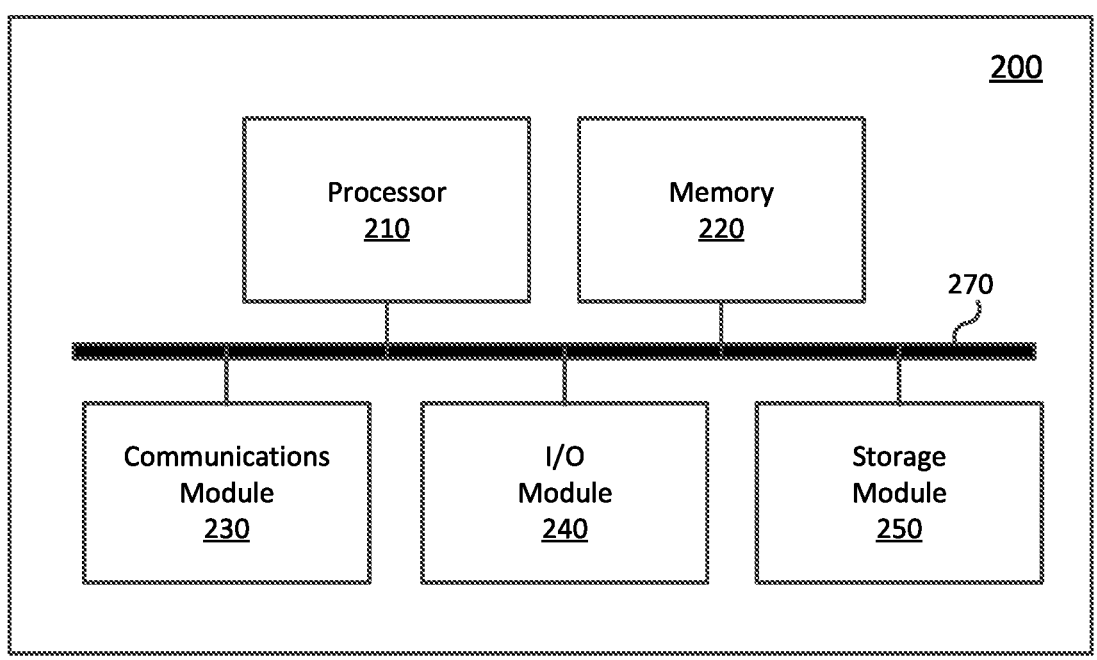
FIG. 2 shows a high-level schematic diagram of a computing device of FIG. 1.

FIG. 2 is a simplified schematic diagram showing components of an exemplary computing device 200. Nodes 120 (FIG. 1) may be of the same type as computing device 200.

The computing device 200 includes a variety of modules. For example, as illustrated, the example computing device 200 may include a processor 210, a memory 220, a communications module 230, an Input/Output (I/O) module 240, and/or a storage module 250. As illustrated, the foregoing example modules of the example computing device 200 are in communication over a bus 270. As such, the bus 270 may be considered to couple the various modules of the computing device 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computing device 200.

The communications module 230 allows the computing device 200 to communicate with various communications networks and/or other computing devices, such as, for example, the other nodes 120 (FIG. 1) of the DLT network 110. For example, the communications module 230 may allow the computing device 200 to send or receive communications signals. Communications signals may be sent or received according to one or more protocols or according to one or more standards. The communications module 230 may allow the computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the computing device 200 to communicate using near-field communication (NFC), via Wi-Fi™, using Bluetooth™ or via some combination of one or more networks or protocols. In some embodiments, all or a portion of the communications module 230 may be integrated into a component of the computing device 200. For example, the communications module 230 may be integrated into a communications chipset.

The I/O module 240 is an input/output module. The I/O module 240 allows the computing device 200 to receive input from and/or to provide input to components of the computing device 200 such as, for example, various input modules and output modules. For example, the I/O module 240 may allow the computing device 200 to receive input from and/or provide output to a display (not shown).

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220.

In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
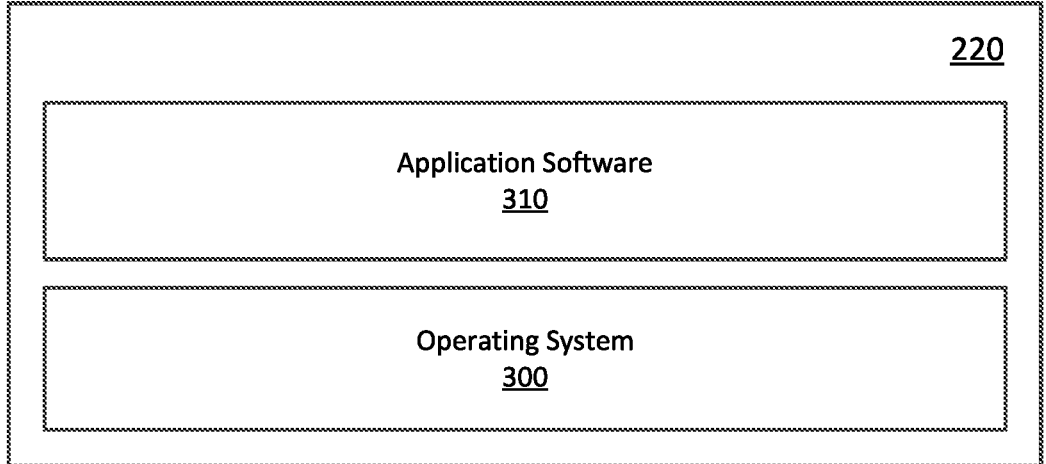
FIG. 3 shows a simplified organization of software components stored in a memory of the computing device of FIG. 2.

FIG. 3 depicts a simplified organization of software components stored in the memory 220 of the computing device 200. As illustrated, these software components include an operating system 300 and an application software 310.

The operating system 300 is software. The operating system 300 allows the application software 310 to access the processor 210 (FIG. 3), the memory 220, the communications module 230, the I/O module 240, and the storage module 250 of the computing device 200. The operating system 300 may be, for example, Google™ Android™, Apple™ iOS™, UNIX™, Linux™, Microsoft™ Windows™, Apple OSX™ or the like.

The application software 310 adapts the computing device 200, in combination with the operating system 300, to operate as a device for aggregating data transfers in a DLT network.

Reference is now made to FIG. 4, which shows, in flowchart form, an example method 400 for aggregating data transfers. Specifically, the method 400 allows for aggregating, in real-time, data transfers within a DLT network.

Operations 402 and onward may be performed by one or more processors of a computing device such as, for example, the processor 210 (FIG. 2) of one or more suitably configured instances of the example computing device 200. The method 400 may be implemented, for example, by a computing system that is associated with a DLT technology, such as the DLT network 110 of FIG. 1. In particular, a computing system that is configured to provide functionalities of a DLT network and aggregating data transfers may perform all or part of the operations of method 400.

At the operation 402, the system obtains transfer definitions for a plurality of transfers to be completed. A transfer definition may include a transferor, a transferee, and a quantity of data to be transferred. In some implementations, a transferor may be a first logical storage location and a transferee may be a second logical storage location. The first and second logical storage locations may reside in one or more memories of one or more computing devices, such as, for example, the memory 220 (FIG. 2) of one or more suitably configured instances of the example computing device 200 (FIG. 2). The one or more computing devices may be nodes 120 (FIG. 1) of the DLT network 110 (FIG. 1).

At the operation 404, the system identifies a set of the plurality of transfers, the set including only the transfers having transfer definitions received during a particular time period. The particular time period may be a very small time period. For example, in some embodiments, the time period may be no more than ten seconds earlier than a current time. As a further example, in some embodiments, the time period may be no more than five seconds earlier than a current time.

At the operation 406, the system performs an aggregation on the transfers in the set to reduce a number of transfers that are to occur. The aggregation yields an amended set of transfers.

Reference is now made to FIG. 5, which is a schematic illustration of a first instance of a set of a plurality of transfers 502 and a first instance of an amended set of transfers 504. The first instance of the amended set of transfers 504 results from the first aggregation 518 of the first instance of the set of the plurality of transfers 502.

The first instance of the set of a plurality of transfers 502 includes a first transfer 506 and a first instance of a second transfer 508. The first transfer 506 is associated with a first transfer definition defining entity B 510 as the first transferor, and defining entity C 512 as the first transferee. Entity B 510 may be a first logical storage area and entity C 512 may be a second logical storage area. The first transfer definition includes a transfer amount of 200 units of data.

The first instance of the second transfer 508 is associated with a first instance of a second transfer definition defining entity A 514 as the second transferor, and defining entity B 510 as the second transferee. Entity A 514 may be a third logical storage area. As previously noted, entity B may be a first logical storage area. The first instance of the second transfer definition includes a transfer amount of 200 units of data.

In some implementations, the first, second, and third logical storage areas may reside in one or more memories of one or more computing devices, such as, for example, the memory 220 (FIG. 2) of one or more suitably configured instances of the example computing device 200 (FIG. 2). The one or more computing devices may be nodes 120 (FIG. 1) of the DLT network 110 (FIG. 1).

The first aggregation 518 is performed on the first instance of the set of the plurality of transfers 502 resulting in the first instance of an amended set of transfers 504. The first instance of the set of the plurality of transfers 502 includes two transfers 506, 508 and the first instance of the amended set of transfers 504 includes one transfer 516. Accordingly, the first instance of the amended set of transfers 504 represents a reduction in the number of transfers to occur.

The first instance of the amended set of transfers 504 includes a third transfer 516. The third transfer 516 is associated with a third transfer definition defining entity A 514 as the third transferor and defining entity C 512 as the third transferee. The third transfer definition includes a transfer amount of 200 units of data. The third transfer 516 represents the net effect of the first transfer 506 (from entity B 510 to entity C 512) and the first instance of the second transfer 508 (from entity A 514 to entity B 510).

FIG. 6 is a schematic illustration of a second aggregation 604 of a second instance of a set of a plurality of transfers 606 to a second instance of an amended set of transfers 608. The second instance of the amended set of transfers 608 results from the second aggregation 604 of the second instance of the set of the plurality of transfers 606.

The second instance of the set of plurality of transfers 606 differs from the first instance of the set of the plurality of transfers 502 (FIG. 5) in that the second logical storage area and the third logical storage area are the same, i.e., that the first transferee (Entity B 510) and the second transferor (Entity B 510) are the same.

As shown in FIG. 6, the second instance of the set of a plurality of transfers 606 includes the first transfer 506 and a second instance of the second transfer 602. As previously noted, the first transfer 506 is associated with a first transfer definition defining entity B 510 as the first transferor and defining entity C 512 as the first transferee. As also previously noted, entity B 510 may be a first logical storage area and entity C may be a second logical storage area. The first transfer definition includes a transfer amount of 200 units of data.

The second instance of the second transfer 602 is associated with a second instance of the second transfer definition defining entity C 512 as the second transferor and defining entity B 510—as the second transferee. The second instance of the second transfer definition includes a transfer amount of 200 units of data.

A second aggregation 604 is performed on the second instance of the set of the plurality of transfers 606 resulting in a second instance of the amended set of transfers 608. The second instance of the amended set of transfers 608 represents a reduction, to zero, of the number of transfers to occur. The reduction, to zero, of the number of transfers in the second instance of the amended set of transfers 608 represents the net effect of the first transfer 506 (from entity B 510 to entity C 512) and the second instance of the second transfer 602 (from entity AC 512 to entity B 510).

Figure 7:
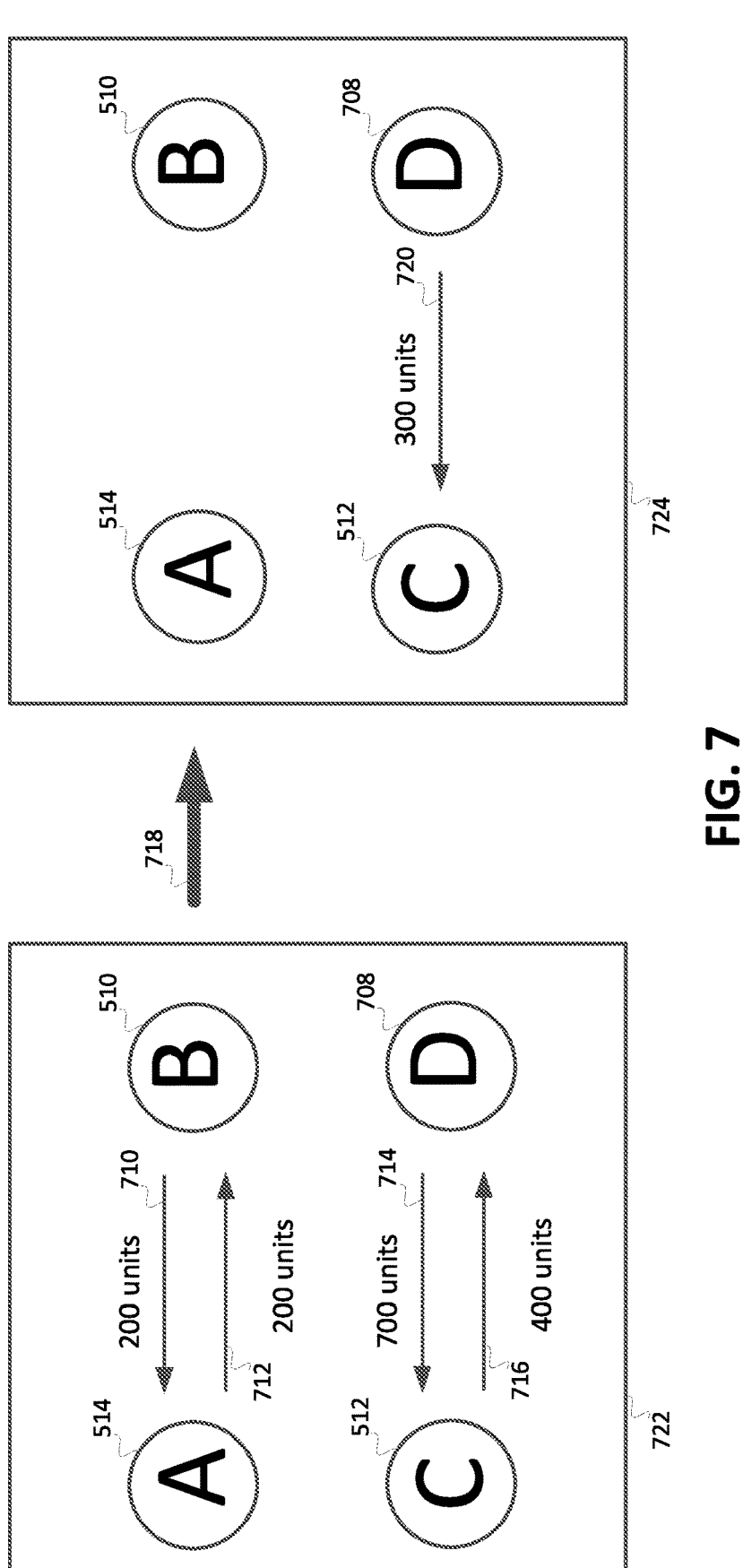
FIG. 7 is a schematic illustration of aa aggregation of a third instance of a set of a plurality of transfers to a third instance of an amended set of transfers.

Reference is now made to FIG. 7, which is a schematic illustration of a third aggregation 718 of a third instance of a set of a plurality of transfers 722 to a third instance of an amended set of transfers 724. The third instance of the amended set of transfers 724 results from the aggregation of the first instance of the set of the plurality of transfers 722.

As shown, the third instance of a set of a plurality of transfers 722 includes a fourth transfer 710, a fifth transfer 712, a sixth transfer 714, and a seventh transfer 716. The fourth transfer 710 is a transfer of 200 units of data from entity B 510 to entity A 514; the fifth transfer 712 is a transfer of 200 units of data from entity A 514 to entity B 510; the sixth transfer 714 is a transfer of 700 units of data from entity D 708 to entity C 512; and the seventh transfer 716 is a transfer of 400 units of data from entity C 512 to entity D 708.

The third aggregation 718 is performed on the third instance of the set of the plurality of transfers 722 resulting in a third instance of an amended set of transfers 724. The third instance of the set of the plurality of transfers 722 includes four transfers 710, 712, 714, 716 and the third instance of the amended set of transfers 724 includes one transfer 720. Accordingly, the third instance of the amended set of transfers 724 represents a reduction in the number of transfers to occur. As shown, the third instance of the amended set of transfers 724 includes an eighth transfer 720 of 300 units of data from entity D 708 to entity C 512. The third instance of the amended set of transfers 724 does not include any transfer of data between entity A 514 and entity B 510.

In the example of FIG. 7, the third aggregation 718 includes identifying one or more transfers to be eliminated and one or more transfers that may be adjusted. Specifically, the example of FIG. 7 includes identifying the fourth transfer 710 and the fifth transfer 712 as one or more transfers that may be eliminated, as the fourth transfer 710 and the fifth transfer 712 have a net sum of zero. The example of FIG. 7 includes identifying the sixth transfer 714 as a further transfer that may be eliminated, and includes identifying the seventh transfer 716 as a transfer that may be adjusted, as the sixth transfer 714 (from entity D 708 to entity C 512) and the seventh transfer 716 (from entity C 512 to entity D 708) have a net effect of the eighth transfer 720 of 300 units from entity D 708 to entity C 512.

The third instance of the amended set of transfers 724 has the same effect as the third instance of the set of the plurality of transfers 722, but has a fewer number of transfers.

Returning again to FIG. 4, after the operation 406, the operation 408 is next.

At the operation 408, immediately after the aggregation, the system completes the amended set of transfers. Completing the amended set of transfers includes updating a shared infrastructure. The shared infrastructure may be a distributed ledger. The distributed ledger may be implemented using a DLT network.

In some embodiments, the system may perform the operation 408 substantially immediately after the operation 406. In other words, the system may complete the amended set of transfers substantially immediately after the aggregation on the transfers. Substantially immediate may refer to the initialization of the completion operation no more than five seconds after performing the aggregation.

In some embodiments, completing the amended set of transfers occurs at a completion time, and the completion time may be no more than one minute after the starting time. In this way, the transfers may be effected in real time or near real time, and the number of completed transfers may be reduced, resulting in a reduction in required computing processing and computer memory.

Embodiments of the present disclosure may have a particular benefit in the context of transferring financial data between regulated accounts, and in particular, between regulated accounts associated with institutions operating in different legal and/or geographical jurisdictions.

Traditionally, such data transfers are implemented by routing the data through a number of intermediaries. Such traditional transfers can be slow (up to five days to complete a transfer), indirect (multiple intermediaries), expensive (multiple fees), and lack transparency to the end users.

Implementing a DLT-based infrastructure for the execution of such data transfers may alleviate these drawbacks. A DLT-based infrastructure may provide instant, transparent, low-cost, point-to-point data transfers, independent of the legal and/or geographical jurisdictions to which the corresponding institutions are subject.

Figure 8:
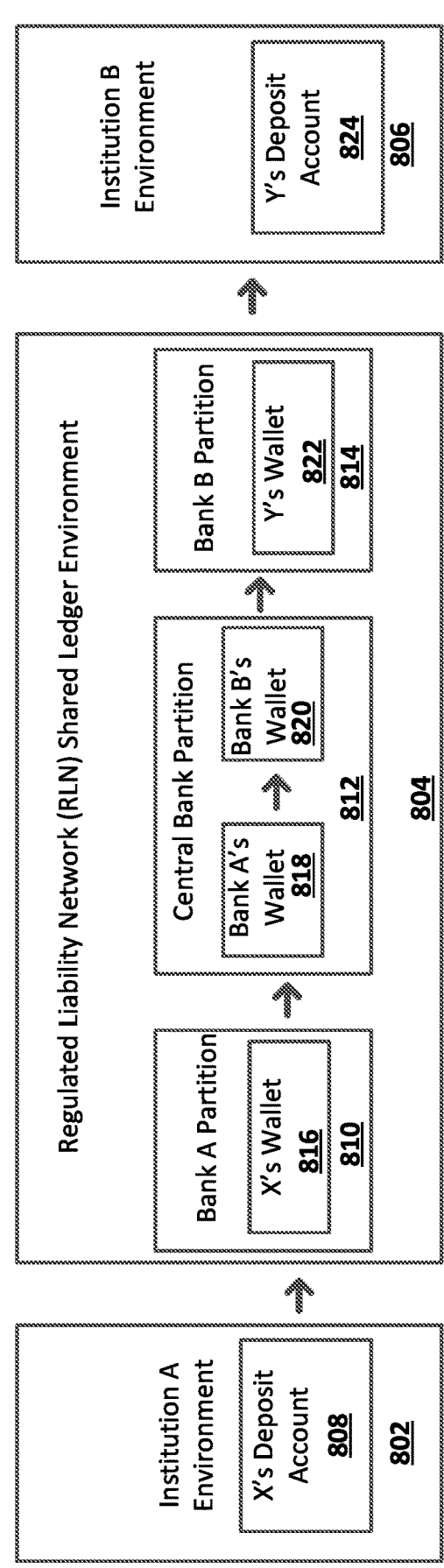
FIG. 8 is a schematic diagram of Regulated Liability Network (RLN) illustrating a data transfer from Customer X's Deposit Account to Customer Y's Deposit Account.

Reference is now made to FIG. 8, which is a schematic diagram of Regulated Liability Network (RLN) illustrating a data transfer from a Customer X's Deposit Account 808 at an Institution A Environment 802 to a Customer Y's Deposit Account 824 at an Institution B Environment 806. A Regulated Liability Network (RLN) is a proposed DLT-based infrastructure for facilitating transfers of financial data. An RLN is described as implementing a private DLT-based infrastructure. The RLN may be accessible to systems associated with each transferor and each transferee identified in the transfer definitions associated with the RLN.

As shown in FIG. 8, the Customer X's Deposit Account 808 is located within the Institution A Environment 802. Institution A may be, for example, a commercial bank or a regulated non-bank, and Customer X may be a client of Institution A. The Customer X's Deposit Account 808 may contain data units. The Institution A Environment 802 may be a memory, such as, for example, the memory 220 (FIG. 2) of one or more suitably configured instances of the example computing device 200 (FIG. 2).

As further shown, a Customer Y's Deposit Account 824 is located within an Institution B Environment 806. Institution B may be, for example, a commercial bank or a regulated non-bank, and Customer Y may be a client of Institution B. The Customer Y's Deposit Account 824 may contain data units. The Institution B Environment 806 may be a memory, such as, for example, the memory 220 (FIG. 2) of one or more suitably configured instances of the example computing device 200 (FIG. 2

FIG. 8 further illustrates an RLN Shared Ledger Environment 804 as logically residing between the Institution A Environment 802 and the Institution B Environment 806. The illustrated RLN Shared Ledger Environment 804 comprises three partitions: a Bank A Partition 810, a Bank B Partition 814, and a Central Bank Partition 812 logically residing between the Bank A Partition 810 and the Bank B Partition 814. It will be noted by those skilled in the art that the RLN Shared Ledger Environment 804 may comprise numerous bank partitions, in accordance with any number of commercial banks and regulated non-banks that are served by the RLN.

Data units within an RLN may be represented as obligation units. For example, while a customer may perceive his account balance to represent an asset, the RLN may view a customer's account balance as an obligation (or liability) of the associated institution to pay the customer on demand at par value in national currency units. In other words, the RLN may perceive a customer's account balance to be a representation of a quantity of a first type of obligation units (or liability units) associated with an obligation issuer and an obligation holder. For obligation units of the first type, the obligation issuer may be the associated institution (e.g., a commercial bank or a regulated non-bank entity), and the obligation holder may be the customer. The first type of obligation units may be stored, for example, within wallets (e.g., the Customer X's Wallet 816, the Customer Y's Wallet 822) associated with customers and residing within a partition of the associated institution (e.g., Bank A Partition 810, Bank B Partition 814). The Customer X's Wallet 816 and the Customer Y's Wallet 822 may reside in one or more memories of one or more computing devices, such as, for example, the memory 220 (FIG. 2) of one or more suitably configured instances of the example computing device 200 (FIG. 2).

The RLN may recognize a second type of obligation units. The second type of obligation units may be characterized in that the obligation issuer is a central bank, and the obligation holder is an associated institution (e.g., a commercial bank or a regulated non-bank entity). The second type of obligation units may be, for example, a Central Bank Digital Currency (CBDC). The second type of obligation units may be stored, for example, within wallets associated with respective institutions and residing within the Central Bank Partition 812, for example, Bank A's Wallet 818, and Bank B's Wallet 820). Bank A's Wallet 818 and Bank B's Wallet 820 may reside in one or more memories of one or more computing devices, such as, for example, the memory 220 (FIG. 2) of one or more suitably configured instances of the example computing device 200 (FIG. 2). The one or more computing devices may be nodes 120 (FIG. 1) of the DLT network 110 (FIG. 1).

The Customer X may desire to transfer a quantity of obligation units from Customer X's Deposit Account 808 located within the Institution A Environment 802 to the Customer Y's Deposit Account 824 located within the Institution B Environment 806.

To initialize the desired data transfer, Customer X may transfer the quantity of obligation units from the Customer X's Deposit Account 808 to the Customer X's Wallet 816, which logically resides within the Bank A Partition 810 of the RLN Shared Ledger Environment 804. The quantity of obligation units in the Customer X's Wallet 816 may define the obligation issuer to be Bank A and the obligation holder to be Customer X. Customer X may then instruct the transfer to Customer Y.

Following the instruction to transfer, the RLN Shared Ledger Environment 804 simultaneously updates all associated balances to complete the transfer atomically. The Bank A Partition 810, the Bank B Partition 814 and the Central Bank Partition 812 are all updated at the same time, and a single record is created upon completion. The associated balances are updated to reflect the removal of the quantity of the first type of obligation units from the Customer X's Wallet 816; the removal of an equivalent quantity of the second type of obligation units from Bank A's Wallet 818; the addition of the equivalent quantity of the second type of obligation units to Bank B's Wallet 820; and the addition of the equivalent quantity of the first type of obligation units to the Customer Y's Wallet 822 residing in the Bank B Partition 814. The resulting quantity of obligation units in the Customer Y's Wallet 822 may define the obligation issuer to be Bank B, and the obligation holder to be Customer Y. The Customer X's Wallet 816 may be a first logical storage area and the Customer Y's Wallet may be a second logical storage area.

Customer Y may then transfer the received quantity of obligation units from the Customer Y's Wallet 822 to the Customer Y's Deposit Account 824.

As noted, embodiments of the present disclosure may have a particular benefit in the context of transferring financial data between regulated accounts associated with institutions operating in different legal and/or geographical jurisdictions. For example, the Institution A Environment 802, which may be a memory, such as, for example, the memory 220 (FIG. 2) of one or more suitably configured instances of the example computing device 200 (FIG. 2), may be subject to a first legal and/or geographical jurisdiction. For example, the Institution A Environment 802 may physically reside in a first legal and/or geographical jurisdiction. The Institution B Environment 806, which may also be a memory, such as, for example, the memory 220 (FIG. 2) of one or more suitably configured instances of the example computing device 200 (FIG. 2), may be subject to a second legal and/or geographical jurisdiction. For example, the Institution B Environment 806 may physically reside in a second legal and/or geographical jurisdiction. While traditional methods of effecting data transfers from one legal and/or geographical jurisdiction to another may involve a time-consuming and expensive process of routing data between numerous intermediaries, an RLN may provide for a real-time transfer of data, regardless of the legal and/or geographical jurisdictions to which the participating parties are subject.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computer system, comprising:
a processor;
a communications module coupled to the processor; and
a memory coupled to the processor, the memory storing instructions that, when executed, configure the processor to:
obtain transfer definitions for a plurality of transfers to be completed;
identify a set of the plurality of transfers, the set including only the transfers having transfer definitions received during a particular time period, the particular time period having a starting time no more than ten seconds earlier than a current time;
perform an aggregation on the transfers in the set to reduce a number of the transfers that are to occur, wherein the aggregation yields an amended set of transfers; and
in response to completion of the aggregation, complete the amended set of transfers, wherein completing the amended set of transfers includes updating a shared infrastructure.

2. The system of claim 1, wherein performing the aggregation on the transfers includes:
identifying one or more transfers that may be eliminated and one or more transfers that may be adjusted; and
based on the identifying, obtaining the amended set of transfers, the amended set of transfers having a same effect as the identified set of transfers but having a fewer number of transfers.

3. The system of claim 2, wherein the set of the plurality of transfers includes:
a first transfer associated with a first transfer definition defining a first transferor as a first logical storage area and a first transferee as a second logical storage area; and
a second transfer associated with a second transfer definition defining a second transferor as a third logical storage area and a second transferee as the first logical storage area.

4. The system of claim 3, wherein the second logical storage area and the third logical storage area are the same.

5. The system of claim 1, wherein the set of the plurality of transfers include a plurality of transfers of quantities of obligation units.

6. The system of claim 5, wherein the shared infrastructure stores a representation of each of the quantities of obligation units, and wherein each of the quantities of obligation units is associated with an obligation issuer and an obligation holder.

7. The system of claim 5, wherein a first obligation issuer associated with a first quantity of obligation units is subject to a first geographical jurisdiction, and a second obligation issuer associated with second obligation units is subject to a second geographical jurisdiction, the first jurisdiction being different than the second jurisdiction.

8. The system of claim 1, wherein the shared infrastructure is accessible to systems associated with each transferor and each transferee identified in the transfer definitions.

9. The system of claim 1, wherein the particular time period has a starting time no more than five seconds earlier than a current time.

10. The system of claim 1, wherein completing the amended set of transfers occurs at a completion time, and the completion time is no more than a minute after the starting time.

11. A computer-implemented method, comprising:

obtaining transfer definitions for a plurality of transfers to be completed;

identifying a set of the plurality of transfers, the set including only the transfers having transfer definitions received during a particular time period, the particular time period having a starting time no more than ten seconds earlier than a current time;

performing an aggregation on the transfers in the set to reduce a number of the transfers that are to occur, wherein the aggregation yields an amended set of transfers; and in response to completion of the aggregation, completing the amended set of transfers, wherein completing the amended set of transfers includes updating a shared infrastructure.

12. The method of claim 11, wherein performing the aggregation on the transfers includes:

identifying one or more transfers that may be eliminated and one or more transfers that may be adjusted; and based on the identifying, obtaining an amended set of transfers having a same effect as the identified set of transfers but having a fewer number of transfers.

13. The method of claim 12, wherein the set of the plurality of transfers includes:

a first transfer associated with a first transfer definition defining a first transferor as a first logical storage area and a first transferee as a second logical storage area; and a second transfer associated with a second transfer definition defining a second transferor as a third logical storage area and a second transferee as the first logical storage area.

14. The method of claim 13, wherein the second logical storage area and the third logical storage area are the same.

15. The method of claim 11, wherein the set of the plurality of transfers include a plurality of transfers of quantities of obligation units.

16. The method of claim 15, wherein the shared infrastructure stores a representation of each of the quantities of obligation units, and wherein each of the quantities of obligation units is associated with an obligation issuer and an obligation holder.

17. The method of claim 11, wherein the shared infrastructure is accessible to systems associated with each transferor and each transferee identified in the transfer definitions.

18. A non-transitory computer readable storage medium comprising processor-executable instructions which, when executed, configure a processor to:

obtain transfer definitions for a plurality of transfers to be completed;

identify a set of the plurality of transfers, the set including only the transfers having transfer definitions received during a particular time period, the particular time period having a starting time no more than ten seconds earlier than a current time;

perform an aggregation on the transfers in the set to reduce a number of the transfers that are to occur, wherein the aggregation yields an amended set of transfers; and in response to completion of the aggregation, complete the amended set of transfers, wherein completing the amended set of transfers includes updating a shared infrastructure.

19. The method of claim 1, wherein in response to the completion of the aggregation, completing the amended set of transfers may include initializing the completion of the amended set of transfers no more than five seconds after performing the aggregation.

20. The method of claim 11, wherein in response to the completion of the aggregation, completing the amended set of transfers may include initializing the completion of the amended set of transfers no more than five seconds after performing the aggregation.

* * * * *